United States Patent [19]
Henderson et al.

[11] Patent Number: 5,551,218
[45] Date of Patent: Sep. 3, 1996

[54] ROUND BALER MONITORING AND CONTROL SYSTEM

[75] Inventors: Steven J. Henderson, Madison, S. Dak.; George B. Cicci, West Bend; Kim P. Viesselmann, Grafton, both of Wis.

[73] Assignee: Gehl Company, West Bend, Wis.

[21] Appl. No.: 309,298

[22] Filed: Sep. 19, 1994

[51] Int. Cl.$^6$ .............................. B65B 11/04; B65B 57/18; B65B 65/08
[52] U.S. Cl. ................................. 53/504; 53/52; 53/64; 53/77; 53/508; 53/587
[58] Field of Search .................................. 53/430, 77, 52, 53/66, 64, 503, 504, 508, 507, 214, 211, 587, 118, 116

[56] References Cited

U.S. PATENT DOCUMENTS

| | | | |
|---|---|---|---|
| 4,376,298 | 3/1983 | Sokol et al. | 364/551 |
| 4,462,079 | 7/1984 | Ito et al. | 364/442 |
| 4,523,280 | 6/1985 | Bachman | 364/424 |
| 4,630,191 | 12/1986 | Strosser | 364/186 |
| 4,715,012 | 12/1987 | Mueller, Jr. | 364/900 |
| 4,803,626 | 2/1989 | Bachman et al. | 364/424.07 |
| 4,855,924 | 8/1989 | Strosser et al. | 364/468 |
| 5,065,320 | 11/1991 | Hayashi et al. | 364/424.01 |
| 5,129,207 | 7/1992 | Butler | 53/587 X |
| 5,152,123 | 10/1992 | Viaud et al. | 53/587 X |
| 5,259,167 | 11/1993 | Underhill et al. | 53/587 X |
| 5,388,504 | 2/1995 | Kluver | 53/587 X |

OTHER PUBLICATIONS

"Straight Talk", Marvin Stone and Mark Zachos, Agricultural Engineering, Nov. 1992, pp. 13–16.

*Primary Examiner*—James F. Coan
*Attorney, Agent, or Firm*—Andrus Sceales Starke & Sawall

[57] ABSTRACT

A control system for a large round baler includes a microprocessor-based implement module mounted to the baler and an input device mounted within the cab of the tractor behind which the baler is towed. The implement module receives inputs from the input device for setting and/or adjusting parameters of baler operation. Sensors are interconnected with various components of the baler for sensing operation of such components, and provide signals to the implement module indicative of baler operations. The sensor signals are analyzed by the microprocessor of the implement module, and various operations of the baler are controlled responsive to the sensor inputs.

14 Claims, 4 Drawing Sheets

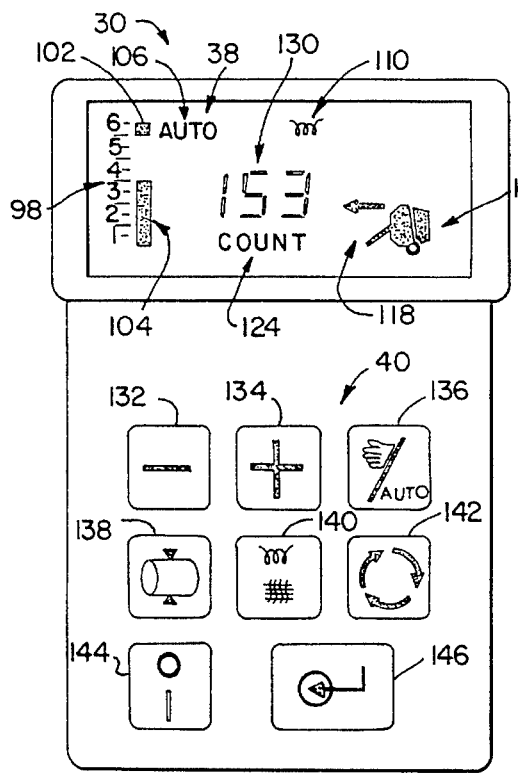
FIG. 3
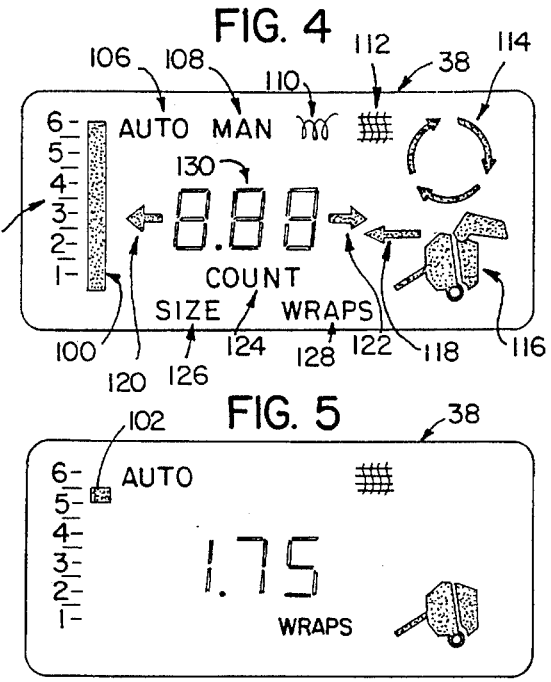
FIG. 4
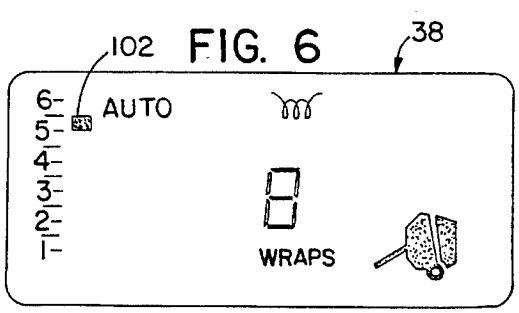
FIG. 5
FIG. 6
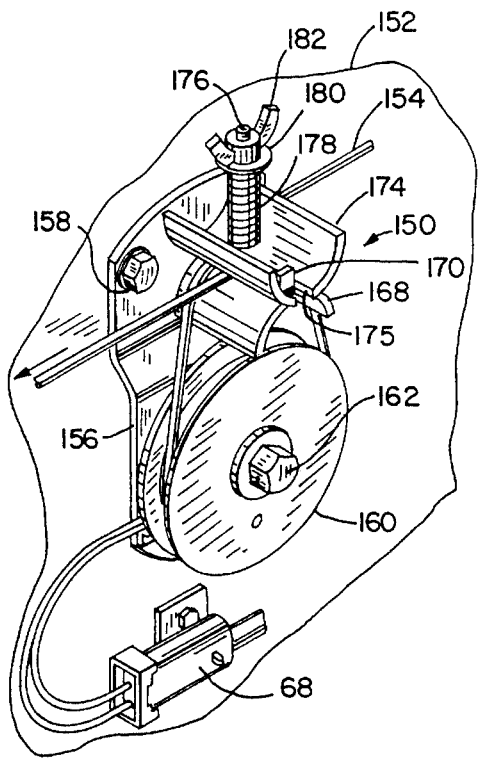
FIG. 7
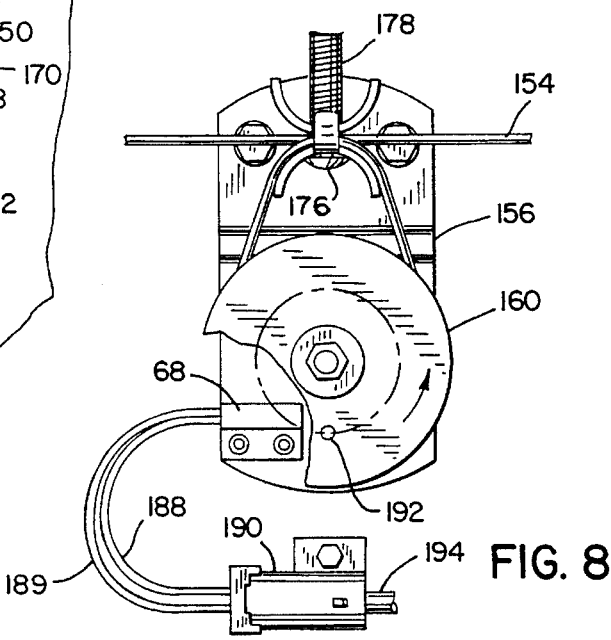
FIG. 8

ROUND BALER MONITORING AND CONTROL SYSTEM

BACKGROUND AND SUMMARY

This invention relates to a baler for forming large round bales of agricultural crop material, and more particularly to a control system for such a baler.

Balers for forming large round bales of agricultural crop material are well known and commonly used. Typically, large round balers are provided with a rather limited control system in which the operator, located in the cab of the tractor behind which the baler is towed, can control a limited number of baler operations using analog signals supplied to and from a control box located within the tractor cab. Analog sensor signals are supplied from one or more sensors which sense operation of one or more components of the baler to provide a signal to the control box indicative of the operation of the sensed component. Analog control signals are provided from the control box to the baler component for controlling its operation responsive to the analog sensor signals. In the advanced systems currently available, the control signals are output by a microprocessor located within the control box which controls baler component operation responsive to the sensor signals. In less advanced systems, the operator manually controls the baler component operation responsive to the sensor signals.

In such prior art systems, for each baler function being sensed or controlled, it has been necessary to install a pair of wires between the tractor cab and the baler. For balers providing a number of sensing or control functions, such wiring is extensive and results in numerous connections and an increased likelihood of failure. Further, the expense of installing such monitors or controls is relatively high since, for each function monitored or controlled, additional hardware and wiring is required.

It is an object of the present invention to significantly advance the state of the art in controlling operation of an agricultural implement such as a large round baler. It is a further object of the invention to provide a large round baler having an operator input module in the tractor cab and an implement control module on the baler, and in which a communications link is established between the cab module and the implement module for sensing operation of one or more baler components and controlling operation of the baler components in response to operator inputs to the cab module. It is a further object of the invention to exploit the advantages offered by providing a microprocessor-based control in the implement module to control one or more operations of the baler. Yet another object of the invention is to provide a unique means of monitoring one or more operations of the baler, and controlling the baler operations in response thereto.

In accordance with one aspect of the invention, a system for controlling one or more operations of an agricultural implement, such as a large round baler towed by a tractor having an operator cab, includes an input device mounted in the tractor cab and an implement control device mounted to the implement and interconnected with one or more components of the implement for controlling one or more operations of the implement. The input device receives input commands from the operator, and includes processing means such as a microprocessor. The implement control device also includes processing means such as a microprocessor. A communication link is interconnected between the input device and the implement control device for communicating control signals from the input device to the implement control device, and for communicating monitor signals from the implement control device to the input device. In this manner, one or more of the baler operations can be monitored and controlled from the tractor in response to manual input commands provided by the operator to the input device. The input device is in the form of a cab module which includes an operator-actuated key pad and a visual display, and the processing means comprises a microprocessor with a programmable memory, housed within the cab module. The implement control device is in the form of an implement module mounted to the implement, and the processing means of the implement control device includes a microprocessor with a programmable memory provided within the implement module. The cab module and its microprocessor cooperate to provide signals over the communication link to the implement module microprocessor. For example, such signals may be indicative of a predetermined desired size of bale to be formed by the baler, and the implement module is interconnected with a bale diameter sensor which cooperates with the implement module microprocessor to provide signals over the communication link to the cab module microprocessor indicative of the actual diameter of the bale as the bale is being formed. In this manner, the cab module functions to provide an output on the visual display of the bale diameter as the bale grows, and to alert the operator when the bale approaches and has attained the predetermined desired size.

The invention further contemplates a method of controlling one or more operations of an agricultural implement such as a large round baler, substantially as set forth in the foregoing summary.

The control system of the invention is adapted to be used in connection with a round baler equipped with a twine wrap system, a mesh-type wrap system, or both. With a twine wrap system, a problem in the past has been uneven distribution of twine across the surface of the bale, due to the location of the pivoting twine arm relative to the bale. With the present invention, it is possible to program the implement module microprocessor so as to control the movement of the twine arm to ensure that the twine is evenly distributed across the surface of the bale. This results in uniform and evenly spaced distribution of twine onto the bale. In addition, in the past it has not been possible to accurately dispense onto the bale a predetermined amount of twine or mesh-type wrap material when the bale being wrapped is less than the full diameter. With the present invention, it is possible to accurately monitor the size of the bale when it is desired to wrap the bale with either twine or mesh-type wrap material, and to dispense onto the bale an accurate amount of twine or wrap material which provides the desired number of wraps of the bale as selected by the operator and input to the cab module, due to operation of the cab module and implement module microprocessors.

In accordance with another aspect of the invention, the diameter of the bale to be formed by the baler can be adjusted from the tractor cab. In the past, it has been necessary for the operator to exit the cab and make a physical adjustment on the baler itself to change the size of the bale being formed by the baler. With the present invention, the cab module and implement module microprocessors cooperate to allow the operator to adjust the desired diameter of the bale from inside the tractor cab. This is accomplished by the operator setting the desired bale diameter on the cab module, and this information is then stored in the cab module microprocessor. The bale diameter is monitored as the bale is being formed within the baler, and signals indicative of actual baler diameter are provided over the communication link from the implement module microprocessor to the cab module microprocessor. An audible signal is provided to the operator when the bale approaches and reaches the predetermined set diameter.

In accordance with another aspect of the invention, the cab module display provides a visual indication of bale growth as the bale is being formed by the baler. The visual indication is responsive to signals provided to the cab module microprocessor from the implement module microprocessor, responsive to the bale diameter sensor. The operator is thus immediately appraised as to the diameter of the bale as it is being formed. The display preferably also includes indicia informing the operator as to the predetermined desired bale diameter. The incremental visual display responsive to bale growth thus provides an immediate indication to the operator as to how close the bale is to the predetermined desired diameter during formation of the bale.

In accordance with a further aspect of the invention, the bale diameter is monitored during formation of the bale by monitoring the position of a sprocket associated with the take-up mechanism, which functions to maintain tension in the baler belts as the belts move within the baling chamber to accommodate growth of the bale. Movement of the take-up sprocket corresponds directly to the size of the bale as it is being formed within the baling chamber, thus providing an accurate reference for monitoring bale size and providing a signal responsive thereto to the implement module.

In accordance with yet another aspect of the invention, the baler control system can be operated in either an automatic or manual mode, responsive to a command input by the operator. In the automatic mode, once the bale attains its predetermined desired size, an audible alarm is provided to the operator to indicate that movement of the tractor should be interrupted. The control system then initiates a bale wrapping operation, in which either twine or mesh-type wrap material is dispensed onto the bale as the bale revolves within the baling chamber. Once the desired numbers of wraps of twine or wrap material are dispensed onto the bale, a discharge sequence is initiated in which the baler tailgate is raised to eject the bale from the bale forming chamber. Thereafter, the baler tailgate is closed and a signal is provided to the operator to again initiate movement of the tractor to begin formation of a new bale. In the manual mode, the operator is first alerted that the bale has reached its desired size. The operator then provides manual inputs to the cab module to initiate the bale wrapping sequence and the bale discharge sequence.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 3 is a front elevation view showing the display and keypad of the cab module of the baler control system;

FIG. 4 is a view showing all of the display icons in the display portion of the cab module of FIG. 3;

FIG. 5 is a view similar to FIG. 4, showing the display icons present when selecting automatic operation of the baler and dispensing of mesh-type wrap material onto the bale;

FIG. 6 is a view similar to FIG. 5, showing the display icons present when selecting automatic operation of the baler and wrapping of the bale with twine;

FIG. 7 is a partial isometric view showing a twine velocity sensor mechanism incorporated into the baler of FIG. 1 for measuring the speed and amount of twine dispensed during wrapping of the bale;

FIG. 8 is a side elevation view, partially in section, of the twine velocity sensing mechanism of FIG. 7;

DETAILED DESCRIPTION OF THE INVENTION

Figure 1:
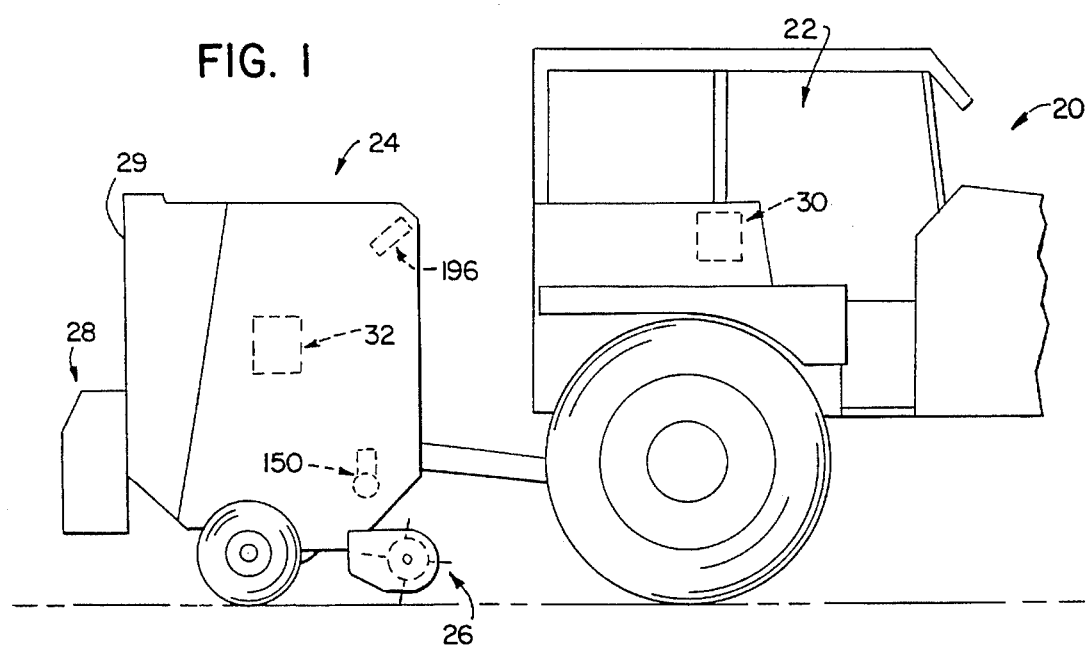
FIG. 1 is a side elevation view showing a tractor towing a baler into which the control system of the invention is incorporated.

FIG. 1 illustrates a tractor 20 having a cab 22, for use in towing a baler 24 for forming large cylindrical or round bales of agricultural crop material. Baler 24 is of the type utilizing a plurality of side-by-side endless belts which define a variable-volume baling chamber within which the bale is formed, in accordance with known construction and operation of such a baler. Generally, baler 24 includes a crop pick-up 26 which functions to feed crop material from a windrow into the interior of baler 24, where the crop material is formed by the baler belts into a large round baler. Baler 24 includes a wrap material dispensing apparatus 28 for wrapping the bale after its formation with mesh-type wrap material. Wrap material dispensing apparatus 28 is preferably as disclosed in Butler U.S. Pat. No. 5,129,207 issued Jul. 14, 1992, the disclosure of which is hereby incorporated by reference. Baler 24 further includes a conventional twine dispensing mechanism which is operable to wrap the formed bale with twine, either alone or in conjunction with mesh-type wrap material. In a conventional manner, baler 24 includes a tailgate section 29 which is movable between a closed position (as illustrated in FIG. 1) and an open position for ejecting a formed and wrapped bale from the interior of baler 24. Baler 24 further includes a conventional belt take-up mechanism which accommodates growth of the bale-forming chamber of baler 24 and maintains tension in the baler belts during growth of the bale.

Illustratively, baler 24 may be that such as is available from Gehl Company of West Bend, Wis. under its designation RB1470, RB1670 or RB1870.

Figure 2:
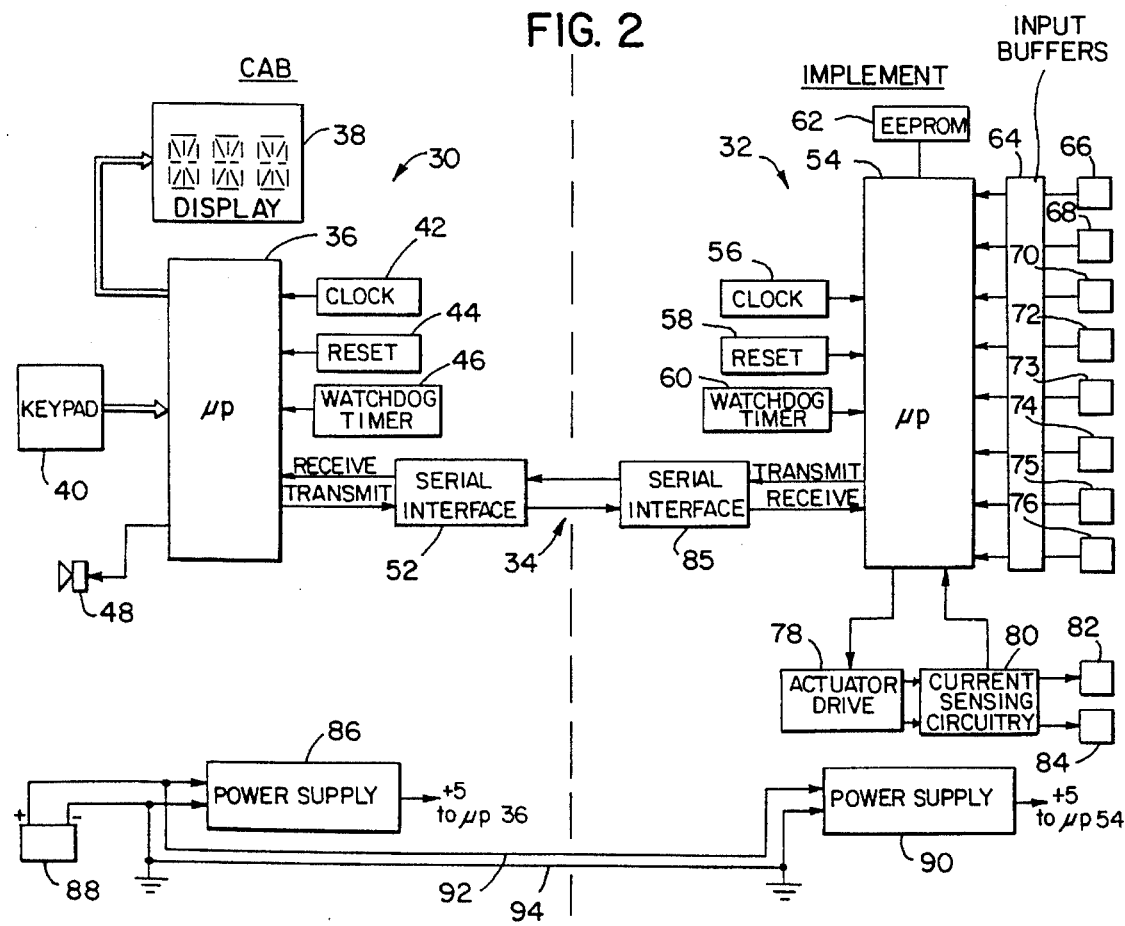
FIG. 2 is a schematic block diagram showing the microprocessor-based cab and implement modules of the round baler control system incorporated into the baler of FIG. 1.

The present invention contemplates a control system for controlling one or more of the operations of baler 24 from tractor cab 22. Generally, the control system of the invention includes a cab module 30 mounted within tractor cab 22 and an implement module 32 mounted to baler 24. Referring to FIG. 2, the components of cab module 30 and implement module 32 are illustrated schematically. A communications link 34 is interconnected between cab module 30 and implement module 32 for establishing communication therebetween, as will be explained.

As shown in FIG. 2, cab module 30 features a microprocessor or microcomputer 36, which illustratively may be a programmable 8XC51 4K ROM CMOS microprocessor. Processor 36 is interconnected with an LCD display 38 and a manually actuated keypad 40. In a conventional manner, microprocessor 36 is also interconnected with a clock oscillator 42, reset circuitry 44 and a watchdog timer 46. An audible alarm 48 is interconnected with microprocessor 36. A serial interface 52 is interconnected with communications link 34, which is preferably a 9600 baud SAE J1708 serial data bus.

Implement module 32 consists of a microprocessor or microcomputer 54, which illustratively may be a programmable 8XC654 16K ROM CMOS microprocessor. In a conventional manner, microprocessor 54 is interconnected with a clock oscillator 56, reset circuitry 58 and a watchdog timer 60. In addition, an electronically erasable programmable read-only memory (EEPROM) 62 is interconnected with microprocessor 54, as are a series of input buffers, shown in block form at 64. Through input buffers 64, a series of signals are provided to microprocessor 54 responsive to sensors and switches which monitor operation of certain components of baler 24, in a manner to be explained. Illustratively, the following monitor sensors and switches are interconnected with input buffers 64 for providing signals to microprocessor 54 indicative of baler operation: a bale size monitor switch 66, a left twine sensor switch 68, a right twine sensor switch 70, a tailgate latch switch 72, an end wrap pause switch 73, a wrap material pinch roll counter 74, a steering left switch 75 and a steering right switch 76. Microprocessor 54 is interconnected with a constant/variable speed actuator drive 78, which in turn is interconnected through current sensing circuitry 80 with a twine arm linear actuator 82 and a wrap material linear actuator 84. Current sensing circuitry 80 is in turn interconnected with microprocessor 54. A serial interface 85 is interconnected between implement module microprocessor 54 and communication link 34.

While the drawings illustrate a hard-wired communication system between implement module 32 and cab module 30, it is understood that any satisfactory means for transferring data from one location to another could be employed, e.g. infrared communications, radio or other transmitter and receiver system, etc.

A cab module transient protected power supply 86 is interconnected with the battery 88 of tractor 20, for providing protected 5 volt power to cab module microprocessor 36 from battery 88. Similarly, an implement module power supply 90 is interconnected via a pair of buses 92, 94 with tractor battery 88, for providing protected 5 volt power to implement module microprocessor 54.

While the above description has identified specific improvements included in cab module 30, it is understood that any other satisfactory components could be substituted to provide an equivalent function.

FIG. 3 illustrates a physical embodiment of cab module 30, which includes LCD display 38 and keypad 40 and which houses microprocessor 36 and the other components shown in FIG. 2 and described above. Cab module 30 is mounted in any satisfactory location within tractor cab 22 in a conventional manner, such that cab module 30 is easily accessible and readable by the tractor operator.

FIG. 3 illustrates a representative set of icons appearing on LCD display 38 during operation of baler 24 while forming a bale. The full set of icons available on display 38 is illustrated in FIG. 4. As shown in FIG. 4, display 38 provides a constant graduated numeric scale 98. Each numeral in scale 98 represents 1 foot of the diameter of the bale being formed by baler 24. In this case, scale 98 contains the numerals 1–6, with 6 corresponding to the maximum diameter, 6 feet, of a bale which can be formed by baler 24. Scale 98 further includes a mark midway between each numeral, which corresponds to a 6 inch increment in bale diameter growth. Immediately adjacent scale 98 is a bale growth icon 100. FIG. 4 illustrates the appearance of bale growth icon 100 when a full size bale is completely formed by baler 24. During formation of a bale by baler 24, however, bale growth icon 100 consists of a target diameter icon 102 (FIG. 3) indicative of the desired diameter of the bale to be formed by baler 24, and a bale growth icon 104 (FIG. 3) indicative of the actual size of the bale as it is being formed by baler 24.

As shown in FIG. 4, display 38 further includes additional icons as follows: an automatic mode icon 106, a manual mode icon 108, a twine wrap icon 110, a mesh-type wrap material icon 112, a wrap cycle icon 114, a tailgate closed/tailgate open icon 116, a Go arrow icon 118, a left arrow icon 120, a right arrow icon 122, a bale count indicator 124, a bale size indicator 126, a number of wraps indicator 128, and a 3-digit numeric display 130.

Referring to FIG. 3, keypad 40 of cab module 30 includes the following manually operated keys or buttons: a retract/subtract key 132, an retract/add key 134, a manual/automatic mode key 136 which illuminates either automatic mode icon 106 or manual mode icon 108, a bale diameter key 138, a twine wrap/mesh-type wrap key 140 which illuminates either twine wrap icon 110 or net wrap material icon 112, a wrap cycle key 142, a power key 144, and an enter key 146.

FIGS. 3, 5 and 6 show various configurations of display 38. FIG. 3 illustrates the configuration of display 38 in an operating mode during bale formation. Bale count indicator 124 is illuminated and numeric display 130 indicates the number of bales which have been formed during the current baling session, which can either be a field bale count or a daily bale count. In a manner to be explained, the operator has selected the automatic mode as indicated by automatic mode icon 106, and a twine wrap mode as indicated by twine wrap icon 110. The operator has also selected a desired finished bale diameter of 6.0 feet, as represented by bale size icon 102 adjacent scale 98.

In a known manner, cab module microprocessor 36 is programmed to operate display 38 and to read all operator key strokes of key pad 40 and to operate audible alarm 48. Cab module microprocessor 36 uses serial data link 34 to pass information to and from implement module microprocessor 54 through serial interfaces 52, 85. Likewise, implement module microprocessor 54 monitors serial communications link 34 and interprets information input to cab module microprocessor 36 through keypad 40 to initiate desired actions of certain components of baler 24, as will be explained. The memory of implement module microprocessor 54 and EEPROM 62 is used for specific configuration information as well as maintenance of selected data (e.g. bale cycle counts, error information, etc.). The software programmed into implement module microprocessor 54 further includes a mechanism to calibrate the wrap cycle to varying implement conditions.

Commands input through keypad 40 to cab module microprocessor 36 will not directly operate any functions of baler 24. Rather, all operator key strokes are serially encoded into short messages that are passed through communication link 34 to implement module microprocessor 54. Each message includes error checking information, so that implement module 54 decodes the key stroke message and only initiates action on the components of baler 24 if the error checking of the received message is correct. When the error checking information does not tally correctly, implement module microprocessor 54 returns implement 24 to a safe condition and attempts to re-establish normal communication with cab module microprocessor 36. Implement module microprocessor 54 is further programmed such that, even during steady state operation conditions, microprocessors 36, 54 maintain active communication to ensure that no changes are occurring. This procedure allows each of microprocessors 36, 54 to detect a failure in communication link 34 and to take appropriate action. That is, implement module microprocessor 54 returns to or stays in a predetermined "safe" mode, such as by powering down, and cab module 30 displays an error message and an audible alarm to alert the operator of a failure of communication link 34. In addition, the software programmed into implement module microprocessor 54 enables implement module microprocessor 54 to take only "safe" actions when it receives a communicatively valid but functionally nonsense command, such as may result from a failure of keypad 40, EMI interference to the circuitry of keypad 40, or an erroneous operator command.

The non-volatile memory of controller module EEPROM 62 stores away information even after power is removed from implement module 32. For example, such information may consist of the lifetime number of bales formed by baler 24, "in-service" date codes and service/diagnostic information.

The software programmed into cab module microprocessor 36 and implement module microprocessor 54 incorporates the above features, and controls cab module 30 and implement module 32 as follows. The particulars of the software and the structure of the software code are apparent to one of ordinary skill in the art.

Initially, at the first start-up of baler 24, a set-up code must be entered into cab module microprocessor 36. To do this, the operator depresses power key 144 until display 38 is illuminated. The operator then depresses add key 134 and manual/automatic key 136 simultaneously, until the set-up code appears on numeric display 130. The operator then presses add key 134 or subtract 132 until the code corresponding to the model of baler 24 appears. For example, the codes corresponding to the models of baler 24 available from the assignee of the present invention may be as follows:

| Display | Model |
|---------|-------|
| Cd 1 | 1470 twine |
| Cd 2 | 1470 twine & wrap material |
| Cd 3 | 1670 twine |
| Cd 4 | 1670 twine & wrap material |
| Cd 5 | 1870 twine |
| Cd 6 | 1870 twine & wrap material |
| Cd 7 | 1310 twine |

The entry of the baler model number at set-up ensures that the proper set of parameters programmed into implement cab module microprocessor 54 are employed.

After set-up and prior to operation of baler 24, the operator is ready to enter the desired operational parameters into cab module 30 for controlling one or more operations of baler 24. To adjust the desired bale diameter, the operator first presses bale diameter key 138 to output on display 38 a numeric display 130 showing the currently-set bale diameter. The operator then presses add key 134 or subtract key 132. Each time add key 134 is pressed, the desired bale diameter is increased by 0.5 feet, and each time subtract key 132 is pressed the desired bale diameter is reduced by 0.5 feet. Target diameter icon 102 moves up or down scale 98 each time one of keys 132, 134 is pressed, to provide a visual indication to the operator of the target bale diameter setting. The uppermost extent of target bale diameter icon 102 indicates the desired bale diameter setting, e.g. in FIG. 3 the target bale diameter setting is 6.0 feet.

If baler 24 is equipped with a mesh-type wrap material dispensing system in addition to a twine dispensing system, the operator utilizes twine/wrap material key 140 to select the material with which the bale is to be wrapped. A twine wrap of the finished bale is selected by pressing twine/wrap material key 140 such that twine icon 110 is illuminated on display 38. The operator then presses enter key 146. A mesh-type wrap of the finished bale is selected by pressing twine/wrap material key 140 until wrap material icon 112 is illuminated. If baler 24 does not include a mesh-type wrap material dispensing system, then only twine icon 110 will be available and displayed on display 38.

The operator can select either an automatic wrapping mode or a manual wrapping mode. Normally, however, the control system will provide automatic wrapping unless instructed otherwise. Automatic mode icon 106 indicates that baler 24 is in an automatic wrapping mode. If the operator wishes to change the mode of operation, the operator presses manual/automatic key 136 until the desired one of automatic icon 106 or manual icon 108 is illuminated. Thereafter, the operator presses enter key 146. To access the automatic wrapping mode while in the manual wrapping mode, the currently selected twine actuator or wrap material actuator must be retracted by first pressing wrap cycle key 142 and then pressing subtract (retract) key 132. At the end of the actuator stroke, the system will enter the automatic mode. To access the manual wrapping mode, the operator presses manual/automatic key 136, and then enter key 146. To move the selected twine wrap actuator or wrap material actuator, the operator presses cycle key 142 and then either add (extend) key 134 or subtract (retract) key 132.

When the system is in the twine wrapping mode, the number of twine wraps can be adjusted by pressing add key 134 or subtract key 132. The operator may select a setting from 1 to 10 wraps, with each setting representing a specific twine density. If the system is in the mesh-type wrap material mode, the number of wraps can be adjusted by pressing add key 134 or subtract key 132. The operator may select from 1.25 wraps up to 9.75 wraps. Wrap adjustments are in 0.25 wrap increments.

Once the operator has set the parameters of operation of baler 24 in cab module 30 as described, the set parameters are transferred through communication link 34 to implement module 32 and its microprocessor 54, and baler 24 is ready for operation. When all systems are ready, the arrow icon 118 is illuminated on display 38 to advise the operator that the system is prepared for operation, as shown in FIG. 3. As the bale of crop material is being formed within baler 24, bale growth icon 104 advances along scale 98 each time an additional 6 inches of increase in the bale diameter is sensed, in a manner as will later be explained. When the bale diameter is within 6 inches of the desired bale diameter, the entire bale growth icon 100 begins flashing, and cab module microprocessor 36 provides a signal to audible alarm 48 to sound alarm 48 once. When the bale reaches its full set target diameter, cab module microprocessor 36 sends a signal to audible alarm 48 to sound alarm 48 three times, and simultaneously microprocessor 36 flashes cycle icon 114. When the mesh-type wrap material mode is selected, these audible and visual signals advise the operator to stop forward movement of tractor 20. When the twine wrap mode is selected, forward travel of tractor 20 should be stopped after both ends of the twine have been caught between the bale and the baler belts, and arrow icon 118 is turned off to indicate that tractor movement should be stopped. During feeding of the wrap medium, either twine or mesh-type wrap material, cycle icon 114 ceases flashing and is solid. When the wrapping operation is complete, cab module microprocessor 36 sends a signal to audible alarm 48 to sound alarm 48 twice, and cycle icon 114 is turned off. This signals the operator to open the tailgate of baler 24 to discharge the formed and wrapped bale. As soon as baler tailgate 29 is unlatched, tailgate latch switch 72, which is a magnetic reed switch, provides an input signal to implement module microprocessor 74, which in turn sends a signal over communication link 34 to cab module microprocessor 36 and to display 38, and the baler icon 116 is illuminated to indicate that baler tailgate 28 is open. When tailgate 29 of baler 24 is subsequently closed after discharge of the formed and wrapped bale, the baler icon 116 is illuminated to indicate that tailgate 29 is closed, and implement module microprocessor 54 provides a one-bale incremental addition to the lifetime and field bale counts.

Several safeguards are incorporated into the system. For example, in a manner to be explained, a sensor is employed to ensure that the take-up shuttle is fully returned to its "home" position before "go" and arrow icon 118 is illuminated, to indicate whether the baler belts are in their proper position for starting a bale. In addition, a twine arm obstruction detector allows the twine arm of baler 24 to return to its "home" position if it hits an obstruction on its extension stroke, and an error message is displayed on display 38 to alert the operator. If the twine arm of baler 24 hits an obstruction on its return stroke, twine arm linear actuator 82 will cease operation and an error message is displayed on display 38 to alert the operator that the obstruction must be cleared and the actuator manually retracted.

During operation of baler 24, display 38 provides a field or daily count of bales formed during a baling session. This bale count is a resettable bale count, which can be cleared by simultaneously pressing add key 134 and subtract key 132 for 5 seconds. The operator can access a non-resettable total bale count by pressing and holding enter key 146 for 5 seconds. Since numeric display 130 is only a 3-character display, the total bale count first provides a 3-digit reading in the thousands, and then a 3-digit reading in the hundreds. For example, a reading of 123 followed by 456 represents a total bale count of 123, 456 bales.

Microprocessors 36, 54 are programmed to output a number of error codes, such as follows:

| Error Code | Explanation |
| --- | --- |
| E1 | twine exhausted; displayed if the baler runs out of twine or stops receiving twine sensor counts while wrapping a bale |

| Error Code | Explanation |
| --- | --- |
| E2 | wrap material exhausted; displayed if the baler runs out of mesh-type wrap material or stops receiving wrap material sensor counts while wrapping a bale |
| E3 | twine or wrap material not started. For twine, if twine is not being dispensed within 30 seconds from cycle initiation, the twine arm returns to its "home" position. For wrap material, if dispensing does not begin within 5 seconds of initiation, the wrap material knife is returned to its cut-off position. |
| E4 | displayed when in manual mode and extend or retract is pressed without first pressing the cycle key. Must first press cycle key, then extend or retract. |
| E5 | twine arm obstruction; the tractor PTO must be stopped and the obstruction cleared, and thereafter the cycle isocompleted manually by extending or retracting the twine arm. |
| E6 | take-up shuttle not returned; when a bale is completed, wrapped and ejected, the take-up shuttle must return fully to its original position within 45 seconds. If it is not, this code is displayed and the operator must make sure a belt is not caught between the baler and the tailgate. |
| E7 | twine or wrap started; displayed if twine or wrap material has started before either twine dispensing or wrap material dispensing cycle has started. |
| E8 | end wrap pause switch failure; readjust sensor so that it is in the open position when the twine arm is fully home. |
| E9 | twine not cut; if at the end of the tie cycle the twine is not cut, error code displayed. |
| E10 | low voltage; determines if system voltage is below a predetermined level. |

As noted previously, FIG. 3 illustrates the various icons displayed on display 38 during formation of a bale within baler 24. The display of FIG. 3 indicates that the operator has selected the automatic twine-wrapping mode, as illustrated by icons 106, 110. The operator has established a target bale diameter of 6.0 feet. The arrow icon 118 is illuminated, indicating that all systems are ready for bale formation, and the closed tailgate baler icon 116 is illuminated. Bale count indicator 124 is illuminated, and numeric display 130 indicates that the operator is about to form the 154th bale in the resettable bale count, i.e. field count or daily count. Bale growth icon 104 indicates that the bale being formed within baler 24 has attained a diameter of 3.5 feet.

FIGS. 5 and 6 illustrate representative appearances of display 38 which appear when selecting the bale wrapping mode and medium. In FIG. 5, the automatic wrap mode icon 106 is illuminated, as is mesh-type wrap material icon 112. This means the operator has pressed twine/wrap material key 140 until wrap material icon 112 is illuminated, and then pressed enter key 146 and add key 134 and/or subtract key 132 to adjust the number of wraps of wrap material to 1.75. Thus, a length of wrap material totalling 1¾ times the circumference of the formed bale will be dispensed by wrap material dispensing system 28 and applied to the outer periphery of the formed bale. The operator has set the desired diameter of the bale at 5.5 feet as illustrated by target bale size icon 102, and baler closed icon 116 indicates that the baler tailgate is closed. Display 38 of FIG. 6 differs in that twine wrap has been selected as indicated by illumination of twine icon 110, and numeric display 130 indicates that the operator has operated add key 134 and/or subtract key 132 to arrive at a wrap density of 8, meaning that a relatively high density of twine will be dispensed and applied to the outer periphery of the formed bale.

FIGS. 7 and 8 illustrate twine velocity sensor assembly 150 for detecting when twine is being dispensed and the velocity at which the twine is being dispensed. Twine velocity sensor assembly 150 is mounted to one of the outwardly facing surfaces of an internal side panel 152 of baler 24 in the location illustrated in FIG. 1. An assembly identical to twine velocity sensor assembly 150 is mounted to the opposite side of baler 24. The twine velocity sensor assemblies, such as 150, are placed in the normal path of the twine strands, shown at 154, on the opposite sides of baler 24 as is known in a conventional twine-wrap baler.

Twine velocity sensor assembly 150 includes a mounting bracket 156 mounted to baler side panel 152 via a series of bolt and nut assemblies 158 in a conventional manner. A pulley 160 is rotatably mounted to bracket 156 via a bushing (not shown) through which a bolt 162 extends. A nut and washer (not shown) retain pulley 160 on bolt 162.

Above pulley 160, a downwardly facing C-shaped clamp member 168 extends outwardly from the upper portion of bracket 156. Clamp member 68 includes an upstanding tab 170. An upwardly facing C-shaped clamp member 174 is located above clamp member 168, and includes a slot 175 for receiving tab 170.

The shank of a vertical bolt 176 extends through aligned vertical openings formed in the upper and lower walls of clamp members 168, 174, respectively. The threaded end of bolt 176 extends through a coil spring 178, and a washer 180 and wing nut 182 are engaged with the threaded end of bolt 176.

Twine 154 is looped over lower clamp member 168 and around pulley 160, then up and over clamp member 168 en route to the baling chamber of baler 24 such that twine 154 is located on either side of bolt 176. Wing nut 182 can be turned on the threaded end of bolt 176 for adjusting the amount of drag applied to twine 154 by upper clamp member 174, as desired by the operator.

Referring to FIG. 8, twine sensor switch 68, which is a magnetic reed switch, is mounted to the central portion of bracket 156 adjacent the surface of pulley 160 facing bracket 156. A pair of leads 188, 189 extend between twine sensor switch 68 and a connector 190.

A magnet 192 is pressed into an opening in pulley 160 in a manner so as to pass over switch 68 during rotation of pulley 160. With this arrangement, switch 68 provides a signal via a cable 194 to input buffers 64 of implement module 32, and thereby to implement module microprocessor 54. The twine velocity sensor assembly on the opposite side of baler 24 includes a magnetic reed switch 70 (FIG. 2) which provides an input signal to implement module microprocessor 54 through input buffers 64. Microprocessor 54 is programmed to determine the amount of twine dispensed for each revolution of the twine dispensing pulleys such as 160, as input from twine sensor switches 68, 70, thereby enabling an accurate amount of twine to be dispensed and applied to the formed bale during the bale wrapping sequence as described previously.

Figures 9, 10:
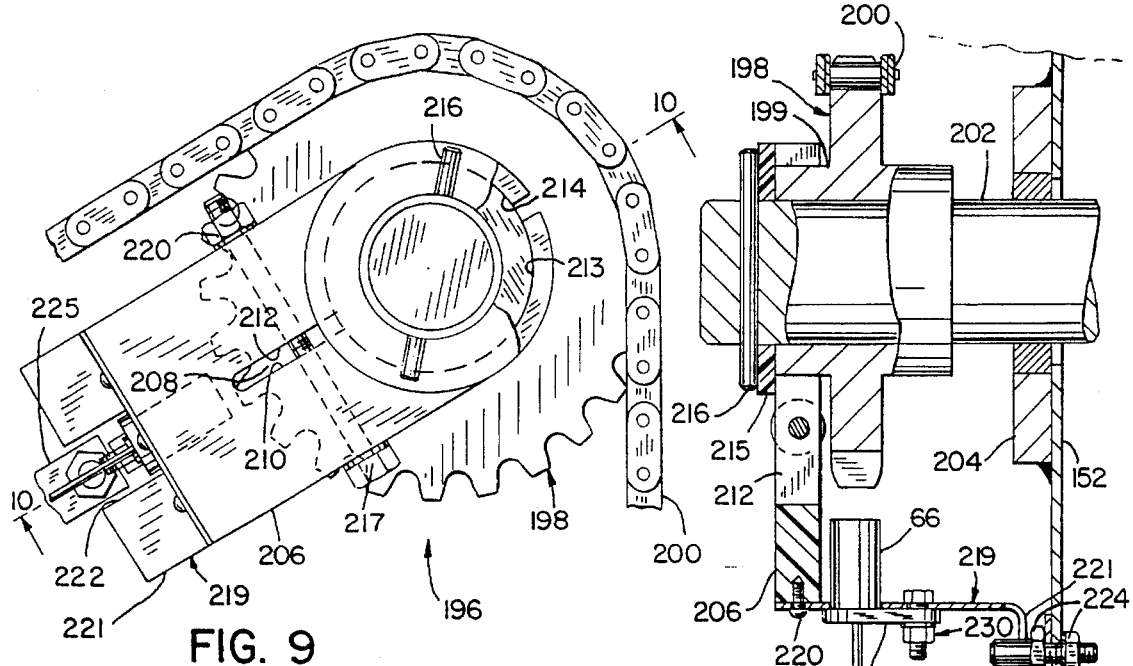
FIG. 9 is a side elevation view showing a bale diameter sensing mechanism incorporated into the baler of FIG. 1.
FIG. 10 is a section view, with portions broken away, taken along line 10—10 of FIG. 9.

FIGS. 9 and 10 illustrate a bale size monitor assembly 196 for detecting the size of the bale being formed by baler 24. The location of bale size monitor assembly 196 is illustrated in FIG. 1. Bale size monitor assembly 196 utilizes a sprocket 198, including a hub 199, associated with the conventional take-up mechanism of baler 24 to sense the growth of the bale as it is being formed. In a manner as is known, a take-up chain 200 is interconnected with sprocket 198. Chain 200 moves on sprocket 198 responsive to movement of the take-up mechanism of baler 24. That is, as the diameter of the bale increases, chain 200 moves along with the take-up mechanism to accommodate increasing growth in the size of the bale forming chamber as defined by the baler belts. Likewise, after the formed bale is discharged, the take-up mechanism returns to its starting position, resulting in movement of chain 200 about sprocket 198 in the opposite direction than that caused during bale formation.

Sprocket 198 is mounted to a shaft 202, which in turn is rotatably mounted to a bushing 204 mounted to the outer surface of one of the baler internal side panels, such as panel 152.

Bale size monitor assembly 196 includes a block 6, formed of a material such as nylon or other low-friction material. Block 206 includes a longitudinal slot 208 defining a pair of spaced side walls 210, 212. Arcuate recesses 213,214 are formed in side walls 210, 212, respectively. Block 206 is retained in place on sprocket hub 199 by a washer 215 and a pin 216 extending through a transverse opening formed in shaft 202. A bolt 217 is then inserted through a transverse passage formed in block 206, and a nut 218 and washer are engaged with bolt 217 to clamp the end of block 206 in position over shaft 202 to prevent its removal therefrom.

Block 206 is mounted at its opposite end to a mounting plate 219 via a series of threaded fasteners 220. Mounting plate 219 is substantially L-shaped, defining a base 221 having a central slot 222. The assembly consisting of L-shaped plate 219 and block 206 is pivotable relative to shaft 202.

A pin 223 having a threaded shank is mounted to baler side wall 152 via a pair of nuts 224 between which baler side wall 152 and one leg of a connector mounting bracket 225 are sandwiched. Pin 223 extends through slot 2 in base 221, and functions as a stop for mounting plate 219. In operation, block 206 rotates along with shaft 202 during movement of the take-up mechanism until base 221 adjacent slot 222 contacts pin 223. This prevents further rotation of block 206 relative to shaft 202. Occasionally, when baler 24 is being operated and little or no crop material is being fed into baler 24, the compressive force exerted on the partially formed bale by the baler take-up mechanism functions to compress the bale, which results in movement of shaft 202 and sprocket 198 in the opposite direction than the direction of movement during growth of the bale. When this occurs, block 206 and mounting plate 219 move in the opposite direction along with shaft 202, until growth of the bale resumes. The width of slot 222 in plate 221 is calculated so as to accommodate any such opposite rotational movement during compression of the bale which may occur, such that pin 223 never comes in contact with the opposite end of base 221 defining slot 222. With this lost motion type construction, a resumption in the growth of the bale results in block 206 and plate 219 rotating along with shaft 202 until subsequent re-engagement of pin 223 with the edge of base 221 forming slot 222 caused by growth of the bale. As the bale grows, shaft 202 rotates relative to block 206 and plate 219, with engagement of pin 223 with the edge of base 221 defining slot 222 preventing rotation of plate 219 and block 206.

Switch 66, which is a Hall-effect type sprocket tooth sensor switch, is mounted to plate 220 via a mounting plate 228 provided on switch 66, and a bolt and nut assembly, shown generally at 230. Switch 66 may be that such as is available from the Microswitch Division of Honeywell Corp. under its Part No. 1GT1. Switch 66 functions to sense passage of one of the teeth of sprocket 198 adjacent thereto, in a conventional manner, and provides a signal through a lead 232 and a connector 233 to implement module microprocessor 54 each time one of sprocket teeth 198 passes adjacent sensor 226. Implement module microprocessor 54 is programmed so as to calculate the amount of increase in the diameter of the bale being formed according to each input received from sensor 226. This input is transferred from implement module 54 through communications link 34 to cab module microprocessor 36, which in turn functions to output on bale growth icon 104 the amount of bale growth corresponding to a predetermined amount of rotation of take-up sprocket 198, to provide the operator a visual indication of bale growth as the bale is being formed within baler 24.

The construction of bale size monitor assembly 196 as set forth above ensures that false signals indicative of bale growth are not sent by switch 66 to implement module microprocessor 54. For instance, if switch 66 were rigidly secured to baler side wall 152 in a fixed position, the compression of the bale as explained above may result in one or more of the teeth of sprocket 198 passing adjacent switch 66 as the bale is being compressed. This would provide a false signal of bale growth through switch 66 to implement module microprocessor 54. The ability of block 206 and plate 219 to rotate backward along with shaft 202 during bale compression maintains the position of switch 66 relative to sprocket 198 so that, when bale growth resumes, switch 66 is in the correct position relative to sprocket 198 for subsequently providing accurate signals to implement module microprocessor 54.

Figure 11:
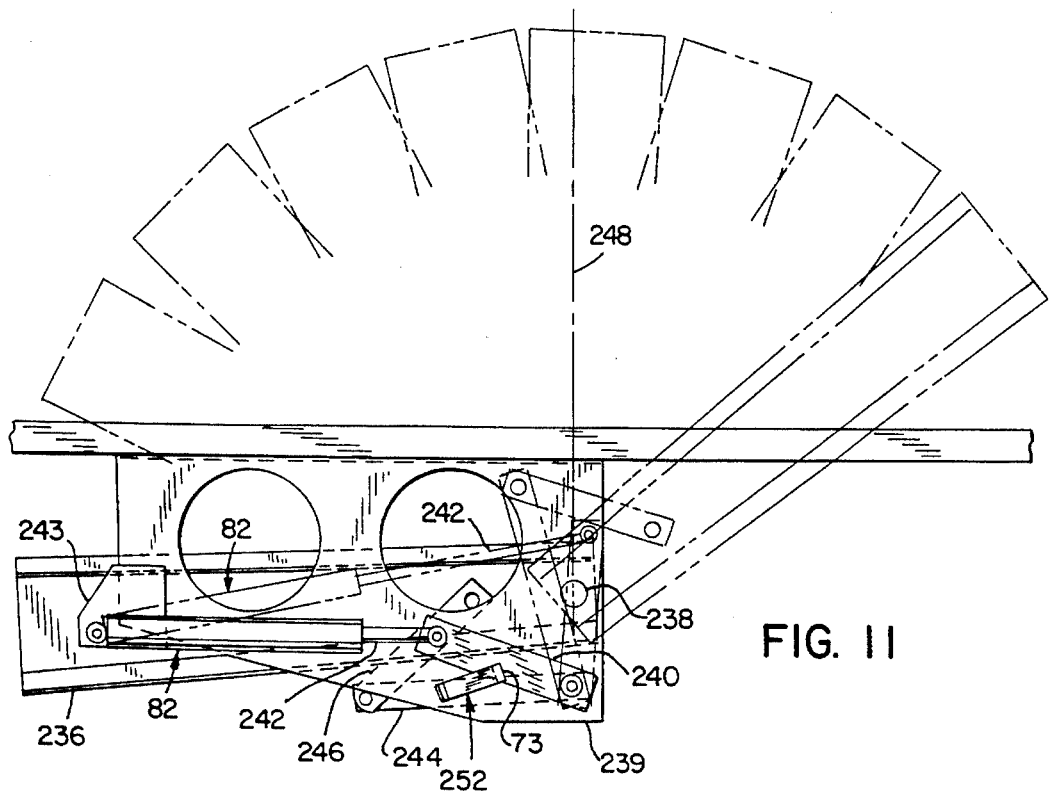
FIG. 11 is a schematic illustration of the twine arm of the baler of FIG. 1, the movement of which is controlled by the control system of the invention to uniformly dispense twine onto the bale.

FIG. 11 illustrates the twine arm, shown at 236, of baler 24. In a manner as is known, twine arm 236 functions to supply the ends of a pair of twine strands, such as 154, to the crop inlet of baler 24, to initiate the twine wrapping operation and to distribute the twine strands across the surface of the bale. Twine arm 236 is pivotably mounted about a pivot pin 238 to a plate 239 mounted to the framework of baler 24, and is movable throughout a range of positions as illustrated in phantom in FIG. 11 to move the twine across the face of the bale during the twine wrapping operation. Twine arm 236 is interconnected with a linkage including a first link 240 mounted for pivoting movement at one of its ends to plate 239, and to the end of the extendible and retractable output member 242 of twine arm linear actuator assembly 82 mounted to plate 239, which in turn is pivotably mounted to plate 239 via an actuator mounting bracket 243. The linkage further includes a second link 244 pivotably mounted to plate 239 and fixed to link 240 for pivoting movement therewith relative to plate 239 in response to movement of linear actuator output member 242. A third link 246 is pivotably mounted at one end to second link 244, and to each other, with link 246 at its other end to twine arm 236 for moving twine arm 236 throughout its range of motion in response to extension and retraction of linear actuator member 242. As can be appreciated, the range of motion of twine arm 236 is off-center relative to the center of the surface of the formed bale, shown at 248, onto which the twine strands are being dispensed. Without the control system of the invention, this results in a greater concentration of twine on the bale in the area of the bale adjacent the "home" position of twine arm 236, illustrated in solid lines in FIG. 11.

The control system of the present invention enables twine arm linear actuator 82 to be controlled by implement module microprocessor 54 through constant speed actuator drive 78 by controlling the duration of the on or off conditions of actuator drive 78, to vary the rate of extension and retraction of its movable output member 242 according to the position of the twine arm. For example, during retraction of linear actuator movable member 242 for moving twine arm 236 between the centerline of the bale and the home position of twine arm 236, linear actuator 82 is operated primarily in its on condition to increase the spacing of the twine as it is dispensed onto the formed bale. In the central portion of the cycle of twine arm 236, linear actuator 82 is only intermittently operated in its on condition, and then subsequently primarily in its on condition as twine arm 236 approaches and returns from both its outermost position and its home position. This sequence of twine arm operation is repeated a number of times corresponding to the twine density selected by the operator during the twine dispensing cycle, to evenly distribute the twine across the surface of the bale as the bale is being wrapped.

In a manner as is known, a twine arm end wrap pause switch assembly 252, which includes switch 73, is mounted to bracket 240. Assembly 252 is in the form of a sideways U-shaped bracket between which link 240 is received when twine arm 236 approaches its home position. End wrap pause switch 73 is interconnected with twine arm linear actuator 82 such that, when switch 73 is actuated by link 240, during movement of twine arm 236 toward its home position, retraction of linear actuator 82 pauses for a short period of time while the bale continues to rotate, resulting in the twine being wrapped several times about the bale at the end of the bale adjacent the home position of twine arm 236. As noted previously, end wrap pause switch 73 is also interconnected with implement module microprocessor 54 to provide an input thereto through input buffers 64, for providing a signal to implement module microprocessor 54 as to the position of twine arm 236. During extension of twine arm linear actuator 82, implement module microprocessor 54 is programmed to interpret the input from end wrap pause switch 252 to indicate that twine arm 236 has commenced movement away from its home position and has begun dispensing twine onto the bale. During retraction of twine arm linear actuator 82, implement module microprocessor 54 is programmed to pause retraction of twine arm linear actuator 82 when end wrap pause switch 73 is actuated by twine arm 236, to apply several wraps of twine to the end of the bale.

As indicated in FIG. 2, twine arm linear actuator 82 is interconnected with current sensing circuitry 80, which in turn is interconnected with speed actuator drive 78 which control the rate of extension and retraction of twine arm linear actuator 82. Output member 242 of twine arm linear actuator 82 is in its fully extended position when twine arm 236 is in its outermost position for dispensing twine onto the opposite end of the formed bale. When linear actuator 82 is fully extended in this manner, the electrical current output by the motor of twine arm linear actuator 82 increases. This increase in current is detected by current sensing circuitry 80, and implement module microprocessor 54 is programmed to cause actuator drive 78 to pause twine arm linear actuator 82 at its fully extended position while the bale is being rotated. Again, this results in several wraps of twine being applied to the opposite end of the formed bale. The several wraps provided at the ends of the formed bale function to provide added wrap strength adjacent the bale ends to prevent the bale from breaking apart during discharge from baler 24 and during subsequent handling of the wrapped bale.

Figure 12:
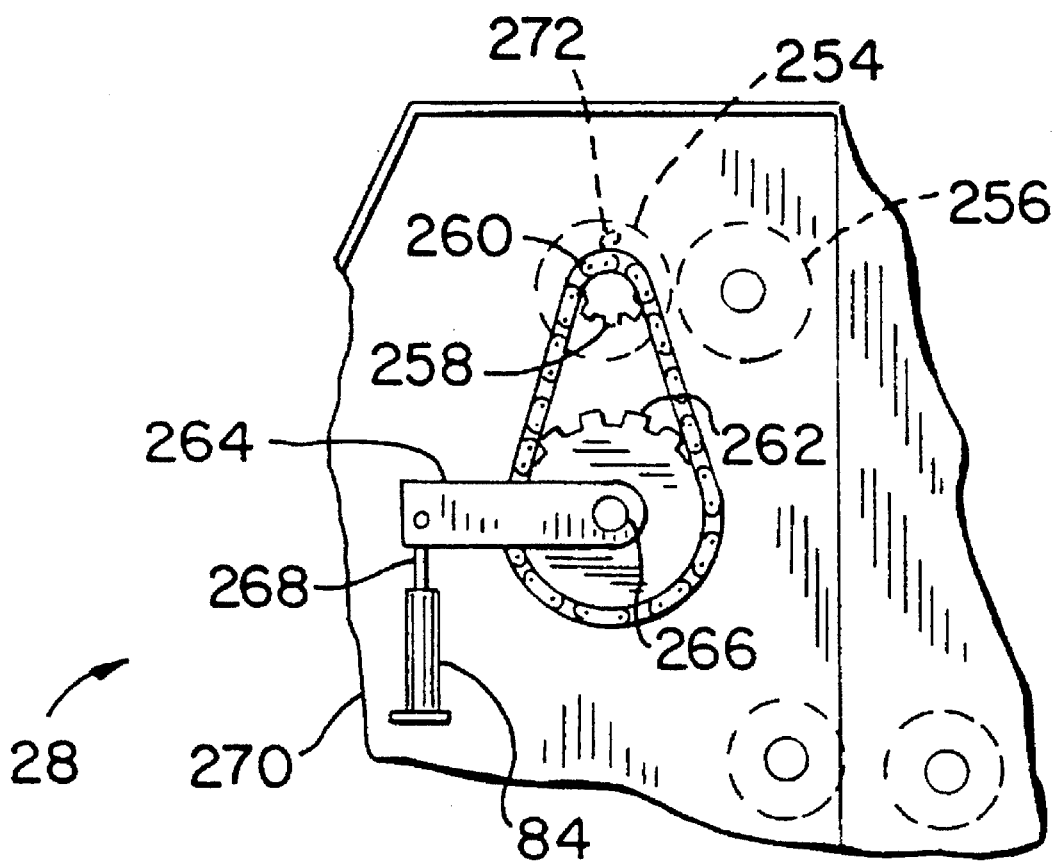
FIG. 12 is a partial side elevation view of a portion of a mesh-type wrap material dispensing mechanism incorporated into the baler of FIG. 1, the operation of which is controlled by the control system of the invention.

FIG. 12 illustrates a portion of mesh-type wrap material dispensing apparatus 28. As described in U.S. Pat. No. 5,129,207, apparatus 28 includes a pair of wrap material supply rollers 254, 256, which define a nip between which the wrap material is located. A sprocket 258 is interconnected with drive pinch roller 254, and a chain 260 is engaged with sprocket 258 and a sprocket 262. A drive member 264 is interconnected with sprocket 262 via a common shaft 266, and the movable output member 268 of wrap material linear actuator 84 is pivotably connected to drive member 264. Wrap material linear actuator 84 is mounted to a side panel 270 of wrap material dispensing mechanism 28.

As explained in U.S. Pat. No. 5,129,207, extension of wrap material linear actuator 84 results in pivoting movement of sprocket 262, which is transferred through chain 260 to sprocket 258, to thereby impart rotation to drive roller 254. This functions to feed the end of the mesh-type wrap material toward a pinch point, from which the wrap material is supplied to the baling chamber and applied to the periphery of the formed bale. Such rotation of drive roller 254 simultaneously results in movement of the cut-off knife of wrap material dispensing mechanism 28 to its retracted position, out of the path of the wrap material.

As the wrap material is being dispensed onto the formed bale, an overrunning clutch associated with drive roller 254 allows drive roller 254 to freely rotate along with nip roller 256. A magnet, such as shown at 272, is mounted to an end of one of rollers 254, 256. As illustrated in FIG. 12, magnet 272 is mounted to drive roller 254. Wrap material pinch roll counter switch 74 (FIG. 2), which is identical in construction to twine sensor switch 68 having a magnetic reed switch located adjacent magnet 272, functions to provide an input signal to implement module microprocessor 54 through input buffers 64 for each revolution of wrap material drive roller 254. Implement module microprocessor 254 is programmed to calculate the amount of wrap material dispensed by wrap material dispensing mechanism 28 for each revolution of drive roller 254, thereby enabling an accurate amount of wrap material to be dispensed onto the formed bale, as determined by the desired number of wraps established by the operator.

In dispensing either twine or mesh-type wrap material onto the formed bale, implement module microprocessor 54 is programmed to take the bale diameter into account when the bale wrapping medium is being dispensed so as to ensure that an accurate amount of twine or mesh-type wrap material is applied to the bale according to the desired twine density or number of wraps of wrap material as input by the operator into cab module 30. The amount of material sensed as dispensed onto the bale is independent of the speed of the tractor PTO, by sensing actual revolutions of the material dispensing system components.

The twine or mesh-type wrap material system is interconnected with bale size monitor assembly 196, to automatically wrap the bale when it is sensed that the bale size has exceeded a predetermined maximum bale size for the baler.

As shown in FIG. 4, display 38 includes a steer left icon 120 and a steer right icon 122. Implement module microprocessor 54 or cab module microprocessor 36 may be programmed so as to alternately illuminate icons 120, 122 for a predetermined period of time, for directing the operator as to desired movement of baler 24 relative to the windrow to ensure that the bale is provided with a uniform diameter throughout its width. Alternatively, steering left sensor 75 and steering right sensor 76 may be interconnected with baler 24 for sensing a differential in the diameter of the bale as it is being formed. Implement module microprocessor 54 is then programmed to interpret the inputs from switches 75, 76 to illuminate steering icons 120, 122 accordingly, thereby instructing the operator to steer tractor 20 relative to the windrow in a manner providing uniform diameter of the bale as it is being formed by baler 24.

The control system of the present invention as shown as described is adapted to be either installed by the baler manufacturer during initial fabrication of baler 24, or to be retrofit onto an existing baler by mounting implement module 32 and the sensors as illustrated in FIGS. 7–12 to baler 24.

In addition, it is understood that other operations of baler 24 can be sensed and controlled by the control system of the present invention in addition to the specific operations sensed and controlled as shown and described.

Further, while the control system of the invention has been illustrated and described with respect to a variable chamber baler 24 in which the baling chamber is defined by a series of side-by-side belts, it is also understood that the control system of the invention can satisfactorily be employed in a fixed chamber baler in which the baling chamber is defined either by a series of fixed position rollers or fixed position belt segments.

Various alternatives and embodiments are contemplated as being within the scope of the following claims particularly pointing out and distinctly claiming the subject matter regarded as the invention.

We claim:

1. A round baler adapted to be towed by a towing vehicle, comprising:

a bale-forming arrangement for forming a cylindrical bale of crop material;

a processor-based control system mounted to the baler responsive to operator commands for setting and adjusting one or more parameters of baler operation;

one or more sensors interconnected with one or more components of the baler and interconnected with the control system for providing inputs thereto indicative of operation of the one or more baler components; and wherein one or more of the baler components are interconnected with the control system for controlling operation of one or more baler components responsive to the control system and the inputs from the one or more sensors;

a tailgate movable between an open position for discharging a bale and a closed position for bale formation, and a latch mechanism for preventing movement of the tailgate away from its closed position, wherein the control system is interconnected with the latch mechanism for receiving a first input therefrom indicative that the tailgate is moved away from its closed position;

a take-up mechanism movable between a home position prior to bale formation and a finish position after bale formation, and including a return mechanism for returning the take-up mechanism to its home position prior to bale formation, wherein the control system is interconnected with the take-up mechanism for receiving a second input therefrom indicative that the take-up mechanism is moved away from its home position; and wherein the control system is interconnected with one or more baler components so as to alert the operator when receiving either or both of the first and second inputs prior to operation.

2. A round baler adapted to be towed by a towing vehicle, comprising:

a bale-forming arrangement for forming a cylindrical bale of crop material;

a take-up mechanism having a movable member which moves in response to growth of the bale within the baler;

a control arrangement mounted to the round baler for controlling one or more operations of the round baler in response to operator commands, the control arrangement including processing means interconnected with one or more components of the baler for receiving inputs indicative of one or more operations of the baler components and for controlling operation of the one or more baler components responsive to the inputs; and an input arrangement interconnected between the movable member and the processing means for providing an input to the processing means indicative of bale size.

3. The round baler of claim 2, wherein the take-up mechanism movable member comprises a sprocket mounted to a shaft and rotatable with the shaft in response to growth of the bale, and wherein the input arrangement interconnected between the sprocket and the processing means comprises a sensor for detecting passage of sprocket teeth in close proximity thereto and providing an input signal to the processing means responsive to passage of the sprocket teeth past the sensor.

4. A round baler adapted to be towed by a towing vehicle, comprising:

a bale-forming arrangement for forming a cylindrical bale of crop material;

a take-up mechanism having a movable member which moves in response to growth of the bale within the baler, wherein the movable member comprises a rotatable member mounted to a shaft forming part of the take-up mechanism, wherein the shaft rotates in a first direction during bale growth and in a second direction in the event the take-up mechanism compresses the bale;

a control arrangement mounted to the round baler for controlling one or more operations of the round baler in response to operator commands, the control arrangement including processing means interconnected with one or more components of the baler for receiving inputs indicative of one or more operations of the baler components and for controlling operation of the one or more baler components responsive to the inputs;

an input arrangement interconnected between the movable member and the processing means for providing an input to the processing means indicative of bale size, wherein the input arrangement functions to detect predetermined increments of rotation of the rotatable member during shaft rotation in the first direction; and a lost motion arrangement associated with the input arrangement for preventing the input arrangement from detecting rotation of the rotatable member during shaft rotation in the second direction.

5. The round baler of claim 4, wherein the input arrangement includes a sensor, and wherein the lost motion arrangement comprises a mounting member interconnected with the shaft to which the sensor is mounted, wherein the mounting member is constructed so as to enable relative movement between the mounting member and the shaft, the mounting member defining an edge, and a stop member mounted to the baler and engageable with the edge upon rotation of the shaft and the rotatable member in the first direction, wherein engagement between the stop member and the mounting member edge prevents rotation of the mounting member wherein rotation of the shaft continues during bale growth.

6. A round baler adapted to be towed by a towing vehicle, comprising:

a bale-forming arrangement for forming a cylindrical bale of crop material;

a bale wrapping arrangement for wrapping a formed bale with a bale-encircling wrap;

a control arrangement mounted to the round baler for controlling one or more operations of the round baler in response to operator commands, the control arrangement including processing means interconnected with one or more components of the baler for receiving inputs indicative of one or more operations of the baler components and for controlling operation of the one or more baler components responsive to the inputs; and wherein the processing means is interconnected with an operator-controlled bale size input for enabling an operator to select a desired final bale size from a range of predetermined desired final bale sizes, and is interconnected with one or more components of the baler for receiving actual bale size inputs indicative of the size of the bale, and wherein the processing means is further interconnected with the bale wrapping arrangement, and wherein the processing means is operable to initiate operation of the bale wrapping arrangement when the bale has attained the selected final bale size as indicated by the bale size inputs.

7. A round baler adapted to be towed by a towing vehicle, comprising:

a bale-forming arrangement for forming a cylindrical bale of crop material;

a twine dispensing mechanism including a rotatable pulley;

a control arrangement mounted to the round baler for controlling one or more operations of the round baler in response to operator commands, the control arrangement including processing means interconnected with one or more components of the baler for receiving inputs indicative of one or more operations of the baler components and for controlling operation of the one or more baler components responsive to the inputs; and an input arrangement interconnected between the pulley and the processing means for providing an input to the processing means indicative of rotation of the pulley and thereby dispensing of twine.

8. The round baler of claim 7, wherein the input arrangement includes a switch stationarily mounted to the baler and a switch actuator provided on the pulley for actuating the switch upon rotation of the pulley, wherein the switch is interconnected with the processing means.

9. A round baler adapted to be towed by a towing vehicle, comprising:

a bale-forming arrangement for forming a cylindrical bale of crop material;

a take-up mechanism movable between a home position prior to bale formation and a finish position after bale formation and including a return mechanism for returning the take-up mechanism to its home position prior to bale formation;

a control arrangement mounted to the round baler for controlling one or more operations of the round baler in response to operator commands, the control arrangement including processing means interconnected with one or more components of the baler for receiving inputs indicative of one or more operations of the baler components and for controlling operation of the one or more baler components responsive to the inputs;

wherein the processing means is interconnected with the take-up mechanism for receiving an input therefrom indicative that the take-up mechanism is moved away from its home position.

10. The round baler of claim 9, wherein the processing means is interconnected with the one or more baler components so as to prevent bale-forming operation of the baler when receiving an input from the take-up mechanism indicative that the take-up mechanism is moved away from its home position prior to bale formation.

11. A round baler adapted to be towed by a towing vehicle, comprising:

a bale-forming arrangement for forming a cylindrical bale of crop material; and a control arrangement mounted to the round baler for controlling one or more operations of the round baler in response to operator commands, the control arrangement including processing means interconnected with one or more components of the baler for receiving inputs indicative of one or mote operations of the baler components and for controlling operation of the one or more baler components responsive to the inputs, wherein the processing means is operable to provide a count of bales produced by the baler during a predetermined period of time.

12. A round baler adapted to be towed by a towing vehicle, comprising:

a bale-forming arrangement for forming a cylindrical bale of crop material; and a control arrangement mounted to the round baler for controlling one or more operations of the round baler in response to operator commands, the control arrangement including processing means interconnected with one or more components of the baler for receiving inputs indicative of one or more operations of the baler components and for controlling operation of the one or more baler components responsive to the inputs, wherein the control arrangement includes an electrical system, and further comprising a sensor interconnected therewith for providing an input to the processing means indicative that the electrical system voltage is below a predetermined threshold.

13. A round baler adapted to be towed by a towing vehicle, comprising:

a bale-forming arrangement for forming a cylindrical bale of crop material;

a wrap material dispensing mechanism including at least one rotatable roller which rotates during dispensing of wrap material;

a control arrangement mounted to the round baler for controlling one or more operations of the round baler in response to operator commands, the control arrangement including processing means interconnected with one or more components of the baler for receiving inputs indicative of one or more operations of the baler components and for controlling operation of the one or more baler components responsive to the inputs; and an input arrangement interconnected between the roller and the processing means for providing an input to the processing means indicative of rotation of the roller and thereby dispensing of the wrap material.

14. The round baler of claim 13, wherein the wrap material dispensing mechanism includes a cut-off mechanism for severing the wrap material, the cut-off mechanism including an actuator, and wherein the actuator is interconnected with the processing means for operating the actuator mechanism responsive to inputs from the input arrangement.

* * * * *

UNITED STATES PATENT AND TRADEMARK OFFICE
CERTIFICATE OF CORRECTION

PATENT NO. : 5,551,218

DATED : September 3, 1996

INVENTOR(S) : STEVEN J. HENDERSON ET AL

It is certified that error appears in the above-identified patent and that said Letters Patent is hereby corrected as shown below:

Claim 11, column 19, line 27, delete "mote" and substitute therefor -- more --.

Signed and Sealed this

Seventeenth Day of December, 1996

*Attest:*

BRUCE LEHMAN

*Attesting Officer*  *Commissioner of Patents and Trademarks*